(12) United States Patent
Yin (10) Patent No.: US 11,460,611 B2
(45) Date of Patent: Oct. 4, 2022

(54) MATRIX OPTICAL SYSTEM, LIGHT CONCENTRATING SYSTEM, AND COMPOUND EYE LENS

(71) Applicant: TOPLITE INTERNATIONAL CO., LIMITED, Hong Kong (CN)

(72) Inventor: Yongjian Yin, Guangdong (CN)

(73) Assignee: TOPLITE INTERNATIONAL CO., LIMITED, Hong Kong (CN)

( * ) Notice: Subject to any disclaimer, the term of this patent is extended or adjusted under 35 U.S.C. 154(b) by 24 days.

(21) Appl. No.: 17/058,602

(22) PCT Filed: Dec. 19, 2019

(86) PCT No.: PCT/CN2019/126732
§ 371 (c)(1),
(2) Date: Nov. 24, 2020

(87) PCT Pub. No.: WO2020/140764
PCT Pub. Date: Jul. 9, 2020

(65) Prior Publication Data
US 2021/0215854 A1    Jul. 15, 2021

(30) Foreign Application Priority Data
Jan. 4, 2019   (CN) .......................... 201910006857.7

(51) Int. Cl.
*G02B 3/00*   (2006.01)
*G02B 19/00*   (2006.01)

(52) U.S. Cl.
CPC ......... *G02B 3/0043* (2013.01); *G02B 3/0062* (2013.01); *G02B 19/0009* (2013.01); *G02B 19/0066* (2013.01)

(58) Field of Classification Search
CPC .............. G02B 3/0043; G02B 3/0062; G02B 19/0009; G02B 19/0066; G02B 3/0056; G02B 19/0014; G02B 3/0037
See application file for complete search history.

(56) References Cited

U.S. PATENT DOCUMENTS 6,124,974 A      9/2000  Burger
2008/0304263 A1*  12/2008  Paulussen ............. F21V 7/0091
                                                      362/231
(Continued)

FOREIGN PATENT DOCUMENTS

CN     1484780      3/2004
CN    107013884     8/2017
(Continued)

OTHER PUBLICATIONS

International Search Report issued for International Patent Application No. PCT/CN2019/126732, dated Mar. 2, 2020, 8 pages including English translation.
(Continued)

*Primary Examiner* — James C. Jones
(74) *Attorney, Agent, or Firm* — Hamre, Schumann, Mueller & Larson, P.C.

(57) ABSTRACT

The present disclosure relates to a matrix optical system, a light ray condensing system and a compound eye lens. The matrix optical system includes a first lens and a second lens. The first lens includes a plurality of first lens units, focal lengths of the plurality of first lens units are different. The second lens includes a plurality of second lens units, focal lengths of the plurality of the second lens units are different. A distance of the plurality of first lens units is different from a distance of the plurality of second lens units. The first lens and the second lens are arranged in parallel and spaced apart. A light ray condensing system and a compound eye lens including the matrix optical system are further provided.

10 Claims, 6 Drawing Sheets

(56) References Cited

U.S. PATENT DOCUMENTS

| | | |
|---|---|---|
| 2009/0002313 A1 | 1/2009 | Iisaka et al. |
| 2015/0211708 A1 | 7/2015 | Stavely et al. |
| 2016/0265740 A1 | 9/2016 | Boouj et al. |
| 2018/0017717 A1 | 1/2018 | Dross |
| 2021/0003746 A1 | 1/2021 | Shibuya et al. |

FOREIGN PATENT DOCUMENTS

| | | |
|---|---|---|
| CN | 107209392 | 9/2017 |
| CN | 107246591 | 10/2017 |
| CN | 107430282 | 12/2017 |
| CN | 109669225 | 4/2019 |
| CN | 209198689 | 8/2019 |
| JP | 6430048 B1 | 11/2018 |
| WO | 2011077688 | 6/2011 |
| WO | 2016050710 | 4/2016 |

OTHER PUBLICATIONS

First Office Action and Search Report issued for Chinese Patent Application No. 201910006857.7, dated Mar. 6, 2020, 10 pages including English translation.

Extended European Search Report issued for European Patent Application No. 19907627.4, dated Jul. 6, 2021, 10 pages.

\* cited by examiner

MATRIX OPTICAL SYSTEM, LIGHT CONCENTRATING SYSTEM, AND COMPOUND EYE LENS

CROSS REFERENCES TO RELATED APPLICATIONS

The present application is a national stage of international Disclosure No. PCT/CN2019/126732 filed on Dec. 19, 2019, which claims priority to Chinese patent application No. 201910006857.7, filed on Jan. 4, 2019. Both applications are incorporated herein by reference in their entireties.

TECHNICAL FIELD

The present disclosure relates to the field of optics, and more particularly, to a matrix optical system, a light ray condensing system and a compound eye lens.

BACKGROUND

In the field of optics, in order to meet the requirements of different light source properties in different scenarios, more and more optical structures and optical systems have emerged. Matrix light source is a light source that combines a plurality of dot-matrix light sources. It has the characteristics of high luminous intensity and good thermal conductivity, and is widely used in various disclosure fields. In order to make better use of the characteristics of this matrix light source, more and more researchers are striving to design a matrix optical system that can increase the light intensity, shorten the optical path, reduce the size of the optical device, and reduce the cost.

However, conventional matrix optical systems still have a problem of low light emitting intensity in practical applications due to its inherent design concept. For example, a total reflection lens array is a condensing lens array in which separate total reflection lenses correspond to unit lights in a one-to-one correspondence on the LED matrix light source according to a certain array form. The arrangement of the array of the total reflection lens units is coincide with centers of the light sources. When the incident light passes through the lens array and emitted, the light spots are distributed in an array, thereby greatly reducing the light intensity. Such a design not only fails to achieve an effect of high-intensity emitting light, but also has problems such as poor condensing effect, large system size due to long optical path, high cost, and the like.

Therefore, the conventional matrix optical systems have the problem of low light emitting intensity.

SUMMARY

Based on the above, it is necessary to provide a matrix optical system, a light ray condensing system and a compound eye lens, to solve the problem of low light emitting intensity existed in the conventional matrix optical systems.

A matrix optical system is provided, including: a first lens and a second lens. The first lens includes a plurality of first lens units, focal lengths of the plurality of first lens units are different, the second lens includes a plurality of second lens units, focal lengths of the plurality of the second lens units are different, a distance of the plurality of first lens units is different from a distance of the plurality of second lens units, and the first lens and the second lens are arranged in parallel to each other and spaced apart from each other.

In the matrix optical system provided by the present disclosure, since the distance of the lens units of the first lens is different from the distance of the lens units of the second lens, a light ray can be deflected after entering the lens. If it is wanted to change the refraction effect of the light ray to achieve the convergence or divergence of the light ray, the optical path length can be adjusted by setting different distances of the lens units without adding other lenses that affect the optical path, so that the light can achieve the desired effect after passing through the matrix optical system. However, by setting different distances of the lens units to achieve the desired change of the optical path length, it is also necessary to set different focal lengths of the lens units according to the expected achievable effect of the change of the optical path, so that the light can have desired optical path refraction after entering the matrix optical system, that is, the convergence and/or divergence of the light ray by the matrix optical system can be achieved.

In an embodiment, the plurality of first lens units of the first lens is composed of N lens units, and the plurality of second lens units of the second lens is composed of N lens units arranged, where N≥2.

In an embodiment, the plurality of first lens units is arranged non-coaxially with the plurality of second lens units.

In an embodiment, when the distance of the plurality of first lens units is greater than the distance of the plurality of second lens units, the focal lengths of the plurality of first lens units and the focal lengths of the plurality of second lens units gradually increase outwards from a geometric center of the matrix optical system.

In an embodiment, when the distance of the first lens units is less than the distance of the second lens units, the focal lengths of the first lens units and the focal lengths of the second lens units gradually decrease outwards from a geometric center of the matrix optical system.

In an embodiment, the plurality of first lens units is different in curved surface structure from the plurality of second lens units.

In an embodiment, the first lens and the second lens are arranged in parallel and spaced apart in a same direction.

In an embodiment, a light ray condensing system is provided. The light ray condensing system includes a matrix light source, a biconvex lens, and the matrix optical system of any one of the above first to fourth embodiments. The first lens and the second lens are arranged between the matrix light source and the biconvex lens. The matrix light source is incident on the first lens. The plurality of first lens units and the plurality of second lens units are arranged in a same direction.

In an embodiment, a distance of light sources of the matrix light source is a, the distance of the first lens units is b, and the distance of the second lens units is c, where a≥b≥c.

In an embodiment, a compound eye lens is provided. The compound eye lens includes the matrix optical system of any one of the above first to sixth embodiments. The plurality of first lens units and the plurality of second lens units are arranged opposite to each other in opposite directions.

DETAILED DESCRIPTION

In order to make the purposes, technical solutions, and advantages of the present disclosure more apparent and understandable, the present disclosure is further described in detail below with reference to the accompanying drawings and embodiments. It should be understood that the specific embodiments illustrated herein are merely for the purpose of explanation, and should not be deemed to limit the disclosure.

It should be noted that, all terms used herein, including technical and scientific terms, shall have the same meaning as commonly understood by a person skilled in the art to which this disclosure belongs. The terms used in the specification of the present disclosure herein are for the purpose of describing specific embodiments only and are not intended to limit the present disclosure. The term "and/or" used herein includes any and all combinations of one or more of the associated listed items.

Figure 1:
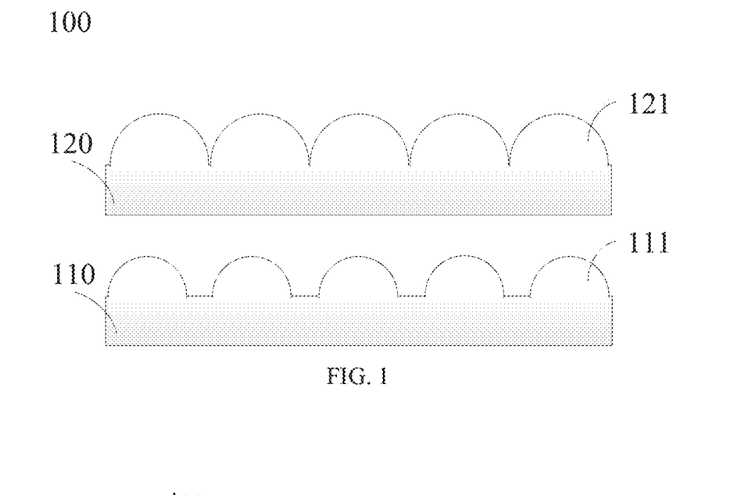
FIG. 1 is a schematic structure diagram of a matrix optical system in an embodiment.

Referring to G. 1, FIG. 1 is a schematic structure diagram of a matrix optical system in an embodiment. In an embodiment, a matrix optical system 100 is provided, and the matrix optical system 100 includes: a first lens 110 and a second lens 120.

The first lens 110 includes a plurality of first lens units 111. The first lens unit 111 can be shaped to be a spherical lens or an aspheric lens. The first lens units 111 can be attached onto a substrate of the first lens 110 by a dot matrix paste method, or it can also be made with the first lens 110 by a one-piece compression molding method. The first lens units 111 can be arranged in a polygonal array matrix, such as a regular hexagon, and the plurality of first lens units 111 can be set to have different focal lengths according to the desired optical imaging effect.

The second lens 120 includes a plurality of second lens units 121. The second lens unit 121 can be shaped to be a spherical lens or an aspheric lens. The second lens units 121 can also be attached onto a substrate of the second lens 120 by a dot matrix paste method, or it can also be made with the second lens 120 by a one-piece compression molding method. The second lens units 121 can be arranged in a polygonal array matrix, such as a regular hexagon, and the plurality of second lens units 121 can be set to have different focal lengths according to the desired optical imaging effect.

The first lens 110 and the second lens 120 are arranged in parallel to each other and spaced apart from each other.

In the matrix optical system provided by the present disclosure, since the distance of the lens units of the first lens is different from the distance of the lens units of the second lens, the non-coaxial arrangement of the lens units causes the light ray to be deflected after incident into the lens. If it is wanted to change the refraction effect of the light ray to achieve convergence or divergence of the light ray, the optical path length can be adjusted by setting different distances of the lens units without adding other lenses that affect the optical path, so that the light can achieve the desired effect after passing through the matrix optical system.

However, by setting different distances of the lens units to achieve the desired change of the optical path length, it is also necessary to set different focal lengths of the lens units according to the expected achievable change effect of the optical path, so that the light can have desired optical path refraction after being incident into the matrix optical system, that is, the convergence and/or divergence of the light ray by the matrix optical system can be achieved.

In an embodiment, referring to FIG. 1, the first lens units of the first lens are composed of N lens units, and the second lens units of the second lens are composed of N lens units, where N≥2.

Since the matrix optical system 100 proposed in the present disclosure changes the optical path length by setting different distances of the lens units, to achieve the desired optical imaging effect of the optical path, that is, there must be at least two lens units for both the first lens 110 and the second lens 120, such that the distance of the first lens units 111 can be set greater or less than the distance of the second lens units 121. The distance of the first lens units 111, or the distance of the second lens units 121, refers to the distances between the axes of the respective lens units. Therefore, in another embodiment, it can be further deduced that there should be at least two lenses in the matrix optical system, that is, in addition to the first lens 110 and the second lens 120, more lenses can be added in the system. The present disclosure does not specifically limit the number of the lenses of the matrix optical system 100 and the number of the lens units on each lens.

Figure 2:
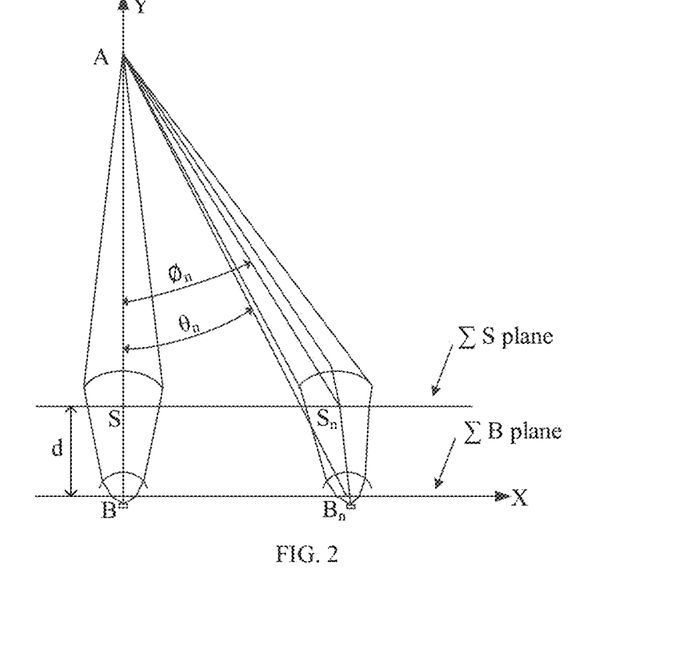
FIG. 2 is a two-dimensional light path structure diagram of a matrix optical system in an embodiment.

Referring to FIG. 2, FIG. 2 is a two-dimensional optical path structure diagram of a matrix optical system in an embodiment. In an embodiment, a matrix optical system is provided. A plane-coordinate system XV will be established for introduction below, including: a plane in which the first lens is located is a ΣB plane, a plane in which the second lens is located is a ΣS plane, and the two planes are parallel to the X axis. The distance between the first lens and the second lens in the direction of the Y-axis is of, the distance of the second lens units ($SS_n$, n≥1) is smaller than the distance of the first lens units ($BB_n$, n≥1), and the light source array located below the ΣB plane is made up of n point light sources (n≥1), which will converge at a focal point A located in the positive direction of the Y axis.

Specifically, when the first lens has two first lens units, a central axis of the central lens unit B on the first lens is collinear with the Y axis, and in this case, the focal length (AS+d) of the central lens unit B passing through the Y axis can be calculated to be less than the focal length $AB_n$ of the adjacent lens unit $B_n$, and the focal length $AB_n$ of the adjacent lens unit $B_n$ can be calculated by the following equation:

$$AB_1 = \sqrt{BB_1^2 + (AS+d)^2},$$

where $AB_1$ is the focal length of the adjacent lens unit $B_1$, $BB_1$ is the value of the distance of the first lens units on the first lens, (AS+d) is the focal length of the central lens unit B on the first lens, and d is the value of the spacing distance between the first lens and the second lens in the direction of the Y axis. Then the focal length $AB_n$ of all the adjacent lens units $B_n$ on the first lens can be expressed by the following equation:

$$\frac{(AS+d)}{AB_n} = \cos\theta_n,$$

where n is a natural integer, n≥1, $\angle\theta_n$ is an angle between the focal length of the central lens unit B and the focal length of the adjacent nth lens unit $B_n$ on the first lens, and $AB_n$ is the focal length of the nth lens unit on the first lens. When there are n first lens units on the first lens, the focal length of the n first lens units can be calculated by the following equation:

$$AB_n = \sqrt{BB_n^2 + (AS+d)^2},$$

where n is a natural integer, n≥1, $BB_n$ represents the value of the distance between the nth lens unit and the central lens unit B on the first lens, $AB_n$ is the focal length of the nth lens unit on the first lens, AS is the focal length of the central lens unit S on the second lens, and d is the value of the spacing distance between the first lens and the second lens in the direction of the Y axis.

Further, when the second lens also has two second lens units, the central axis of the central lens unit S on the second lens is collinear with the Y axis, and in this case the focal length AS of the central lens unit S passing through the Y axis can be calculated to be less than the focal length $AS_n$ of the adjacent lens unit $S_n$, and the focal length $AS_n$ of the adjacent lens unit $S_n$ can be calculated by the following equation:

$$AS_1 = \sqrt{SS_1^2 + AS^2},$$

where $AS_1$ is the focal length of the adjacent lens unit $S_1$, $SS_1$ is the value of the distance of the second lens units on the second lens, and AS is the focal length of the central lens unit S on the second lens. Then the focal length $AS_n$ of all the adjacent lens units $S_n$ on the second lens can be expressed by the following equation:

$$\frac{AS}{AS_n} = \sin\phi_n,$$

where n is a natural integer, n≥1, $\angle\varnothing_n$ is an angle between the focal length of the central lens unit S and the focal length of the adjacent nth lens unit $S_n$ on the second lens, and $AS_n$ is the focal length of the nth lens unit on the second lens. When there are n second lens units on the second lens, the focal length of the nth second lens unit can be calculated by the following equation:

$$AS_n = \sqrt{SS_n^2 + AS^2},$$

where n is a natural integer, n≥1, $SS_n$ represents the value of the distance between the nth lens unit and the central lens unit S on the second lens, $AS_n$ is the focal length of the nth lens unit on the second lens, and AS is the focal length of the central lens unit S on the second lens.

In practical applications, to make the light ray converge at a focal point A after passing through the matrix optical system, a matrix optical system satisfying the above conditional relation can be established by setting the difference between the distance of the lens units of the first lens and the distance of the lens units of the second lens and setting the focal lengths of the respective lens units.

It should be noted that, in practical applications, the first lens units and the second lens units of the matrix optical system can also have structures different from those shown in FIG. 2, that is, the lens units of the first lens units or the second lens units can be arranged closely, or the lens units of the first lens units or the second lens units can be arranged at intervals, or even the structure of the first lens units is completely different from the structure of the second lens units. The setting of the above parameters is not limited, but it must meet the requirements of the changing trend of the distances of the lens units. That is, when the distance of the second lens units is smaller than the distance of the first lens units, the focal lengths of the lens units gradually increase outwards from the geometric center, and in this case, after the light ray is incident into the matrix optical system from the first lens side, the emitted light shows a condensing trend. When the distance of the second lens units is greater than the distance of the first lens units, the focal lengths of the lens units gradually decrease outwards from the geometric center, and in this case, after the light ray is incident into the matrix optical system from the first lens side, the emitted light presents a diverging trend.

In this embodiment, it is mainly described specifically when the matrix optical system is set to have two first lens units and two second lens units. On the basis that the first and the second lenses are each set to have two lens units, the focal lengths required for the remaining unit lens can be calculated by using the parameters such as the distance of the lens units and the focal length of the center lens unit. After completing the settings of the lens units, it can be achieved that when the distance of the first lens units is greater than the distance of the second lens units, the focal lengths of the first lens units and the focal lengths of the second lens units gradually increase outwards from the geometric center of the matrix optical system, and in this case, the light ray is incident into the matrix optical system from the first lens side and then converge. When the distance of the first lens units is smaller than the distance of the second lens units, the focal lengths of the first lens units and the focal lengths of the second lens units gradually decrease outwards from the geometric center of the matrix optical system, and in this case, the light ray are incident into the matrix optical system from the first lens side and then diverge.

In the technical solution of the above embodiment, after the light ray is incident into the matrix optical system from the first lens side, the light ray will be affected by the different distances of the lens units and present different effects of the emitting light, which can not only increase the intensity of the emitting light, but also shorten the optical path, thereby reducing the volume of the matrix optical system and reducing the cost. In addition, since the technical solution of the present disclosure uses the difference between the distances of the lens units to set non-coaxial to change the optical path, which is completely different from the coaxial concept of the prior art, it provides a new idea for the design of other optical systems.

In an embodiment, referring to FIG. 1, the first lens unit 111 and the second lens unit 121 are arranged non-coaxially. The matrix optical system 100 proposed in the present disclosure is designed by adopting the design concept of non-coaxial lens units, and the degree of non-coaxial deviation of the lens units can be embodied by the difference between the distances of the respective lens units on the first lens 110 and the second lens 120, that is, the larger the distance of the first lens units 111 with respect to the distance of the second lens units 121, the greater the degree of non-coaxial deviation of the lens units. To change the optical path of the incident light for the matrix optical system 100, it can be achieved by setting different distances of the lens units, which can make the incident parallel light converge or diverge.

Figure 3:
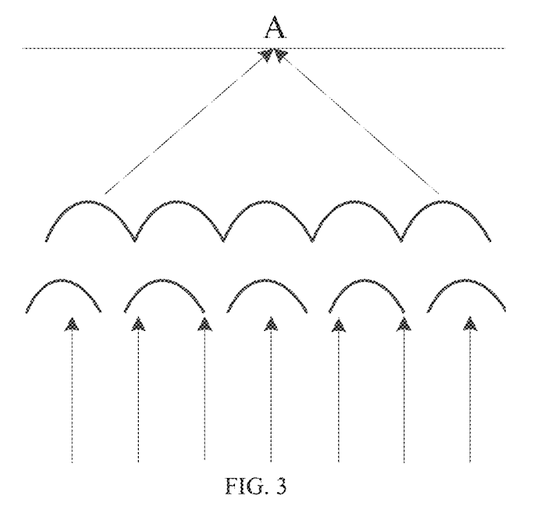
FIG. 3 is a simplified light path diagram of a matrix optical system in an embodiment.

Referring to FIG. 3. FIG. 3 is a simple light path diagram of a matrix optical system in an embodiment. In an embodiment, a matrix optical system is provided. When the distance of the first lens units is greater than the distance of the second lens units, the focal lengths of the first lens units and the focal lengths of the second lens units gradually increase outwards from the geometric center of the matrix optical system.

Since the distance of the first lens units is greater than the distance of the second lens units, and the focal lengths of the first lens units and the focal lengths of the second lens units gradually increase outwards from the geometric center of the matrix optical system, the light ray are incident into the matrix optical system and then coverage at a focal point A.

Figure 4:
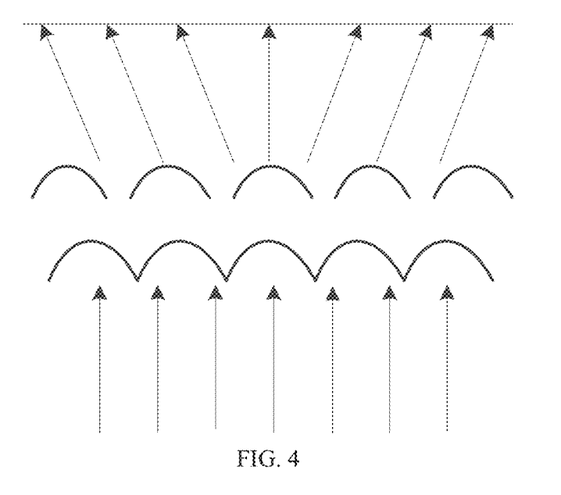
FIG. 4 is a simplified light path diagram of a matrix optical system in another embodiment.

Referring to FIG. 4, FIG. 4 is a simple light path diagram of a matrix optical system in another embodiment. In an embodiment, a matrix optical system is provided. When the distance of the first lens units is less than the distance of the second lens units, the focal lengths of the first lens units and the focal lengths of the second lens units gradually decrease outwards from the geometric center of the matrix optical system.

Since the distance of the first lens units is smaller than the distance of the second lens units, and the focal lengths of the first lens units and the focal lengths of the second lens units gradually decrease outwards from the geometric center of the matrix optical system 500, after the light ray is incident into the matrix optical system, the light ray will present a divergent state.

In an embodiment, referring to FIG. 1, the structure of the curved surface of the first lens unit 111 is different in curved surface structure from the second lens unit 121.

The first lens unit 111 and the second lens unit 121 can have different structures and different shapes. In practical applications, for the first lens unit 111 and the second lens unit 121, upon the setting of satisfying the distance condition and the focal length condition, it can be further considered to enhance the light emitting efficiency and the light emitting angle of the matrix optical system 100 by changing the structure or the shape of the lens units. Therefore, the present disclosure does not specifically limit the structure of the lens units on the matrix optical system 100.

In an embodiment, referring to FIG. 1, the first lens 110 and the second lens 120 are arranged in parallel and spaced apart in the same direction.

The combination of the first lens 110 and the second lens 120 can be that, the first lens units 111 and the second lens units 121 are combined in parallel and spaced apart in the same direction, or the first lens units 111 and the second lens units 121 are arranged in parallel and spaced apart from and opposite to each other in opposite directions, or can also be that, the first lens units 111 and the second lens units 121 are arranged in parallel and spaced apart from and fit with each other in opposite directions.

Figure 5:
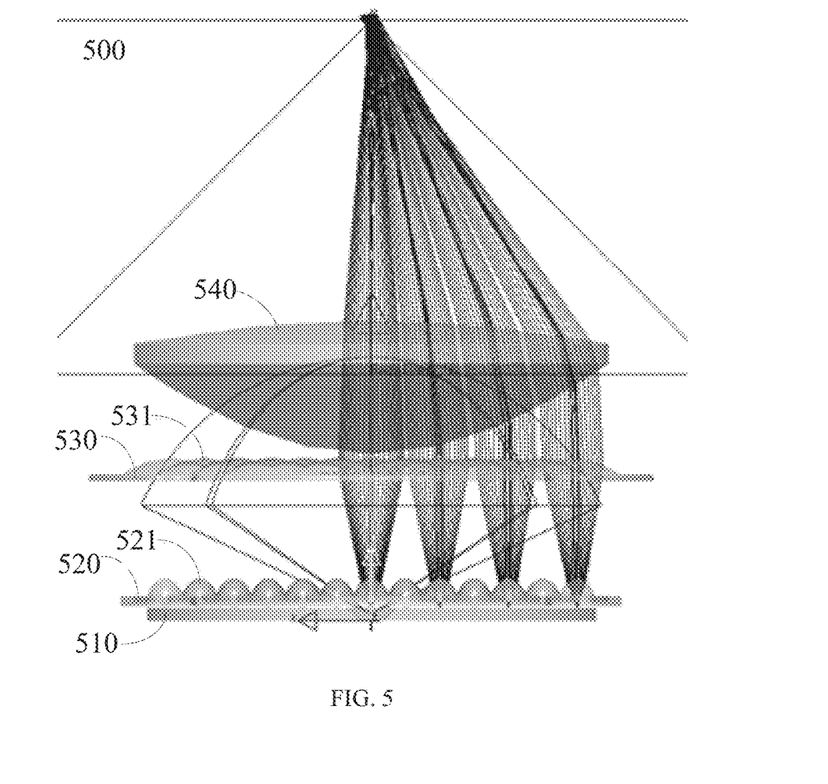
FIG. 5 is a schematic structure diagram of a light ray condensing system in an embodiment.

Referring to FIG. 5, FIG. 5 is a schematic structure diagram of a light ray condensing system in an embodiment. In an embodiment, a light ray condensing system 500 is provided. The light ray condensing system 500 includes a matrix light source 510, a biconvex lens 540, and the matrix optical system of any one of the above first to fourth embodiments. The first lens 520 and the second lens 530 are arranged between the matrix light source 510 and the biconvex lens 540. The light ray emitted from the matrix light source 510 is incident on the first lens 520. The first lens units 521 and the second lens units 531 are arranged in the same direction.

Figure 6:
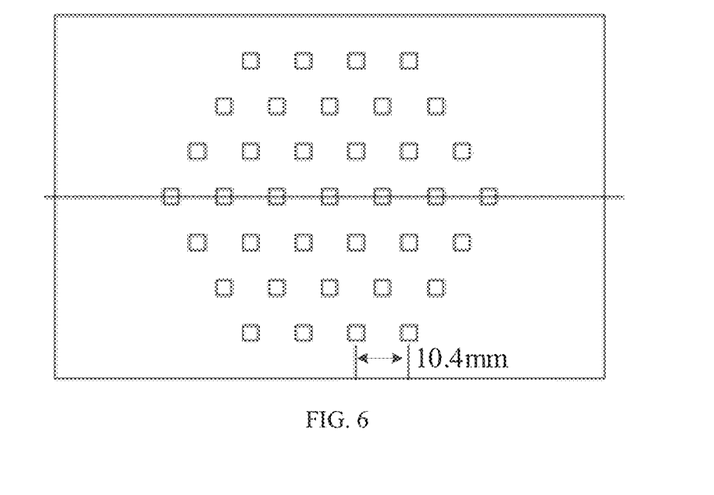
FIG. 6 is a schematic structure diagram of a matrix light source of a light ray condensing system in an embodiment.
Figure 7:
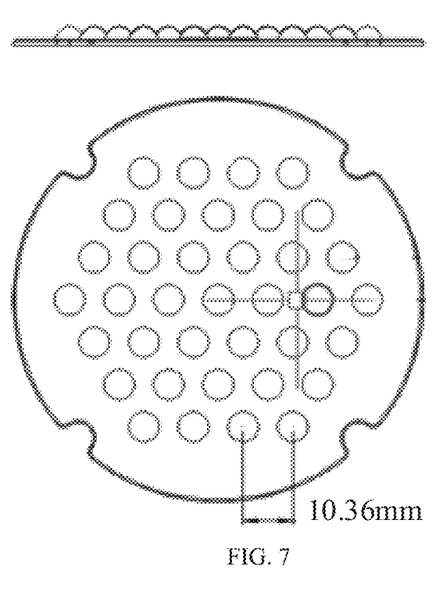
FIG. 7 is a schematic structure diagram of a first lens of a light ray condensing system in an embodiment.
Figure 8:
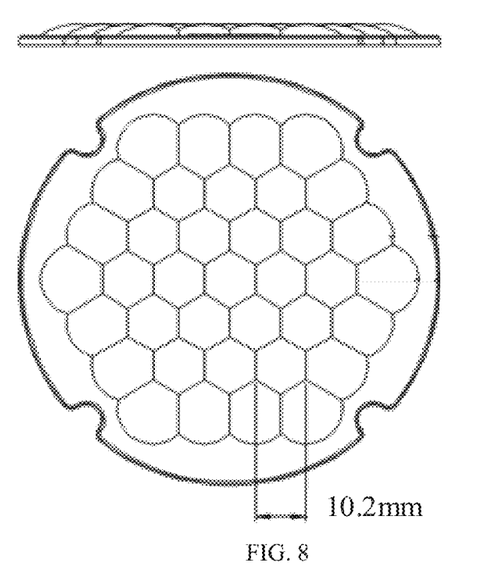
FIG. 8 is a schematic structure diagram of a second lens of a light ray condensing system in an embodiment.

The matrix light source 510 can be a light source formed by an array of a plurality of single LED chip light sources, and its structure is shown in FIG. 6. FIG. 6 is a schematic structure diagram of the matrix light source of the light ray condensing system in an embodiment. The biconvex lens 540 can be an aspheric biconvex condensing lens, or a spherical or aspheric condensing lens. In addition, the distance of the matrix light source 510 is greater than the distance of the first lens units 521, and the distance of the first lens units 521 is further greater than the distance of the second lens units 531. The structures of the first lens and the second lens can refer to FIG. 7 and FIG. 8, FIG. 7 is a schematic structure diagram of the first lens of the light ray condensing system in an embodiment, and FIG. 8 is a schematic structure diagram of the second lens of the light ray condensing system in an embodiment.

The matrix light source 510 of the light ray condensing system 500 is made up of 36 LED dot-matrix light sources arranged in a form of a regular hexagon, and the center to center distance of each of the LED chip light sources is 10.4 mm. In order to facilitate processing, the first lens 520 of the light ray condensing system 500 is formed by 37 short focal length aspheric lenses arranged in a form of a regular hexagon, the focal length of each lens gradually increases outwards from the center of the geometric structure, and the distance of the first lens units 521 is 10.36 mm. The second lens 530 of the light ray condensing system 500 is formed by 37 short focal length aspheric lenses arranged in a form of a regular hexagon, the focal length of each lens gradually increases outwards from the center of the geometric structure, and the distance of the second lens units 521 is 10.2 mm.

The light ray condensing system 500 provided by the present disclosure includes the above matrix optical system. The matrix light source 510 is arranged on the plane side of the first lens 520, and the biconvex lens 540 is arranged on the second lens unit 531 side of the second lens 530, so as to ensure that after the light ray are incident on the first lens 520 along the direction of the Z axis and pass through the biconvex lens 540, the light ray can focus at a short-distance focal point and has increased light intensity.

This embodiment mainly provides a light ray condensing system including a matrix optical system. By arranging the first lens units and second lens units to have different structures and shapes, under the condition of ensuring a structure that the distance of the second lens units is greater than the distance of the first lens units and the distance of the matrix light sources is greater than the distance of the first lens units, the light ray emitted from the LED chip matrix light source can be focused at one point after passing through the matrix optical system, so that the LED matrix light source is more easier to achieve high power. In addition, after adding a biconvex condensing lens, the focusing distance of the light ray can be shortened, and in practical applications, the size of the light ray condensing system is reduced, the condensing efficiency of the light ray condensing system is enhanced, and the cost is reduced.

In an embodiment, a light ray condensing system is provided, the distance of the matrix light source is a, the distance of the first lens units is b, and the distance of the second lens units is c, a≥b≥c.

Referring to FIG. 5, the distance of the light sources on the matrix light source 510 is set to a, the distance of the first lens units 521 is set to b, and the distance of the second lens units is set to c. In order to make the light ray condensing system 500 have the light ray condensing effect, it can be a≥b≥c.

Figure 9:
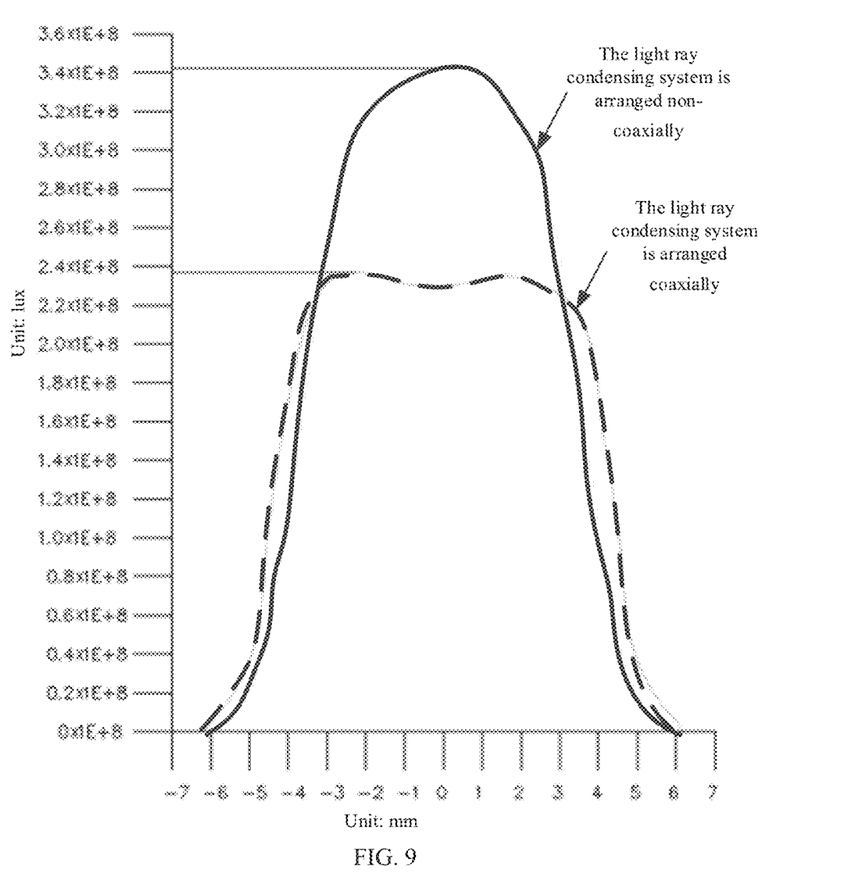
FIG. 9 is a graph showing energy curves of a light ray condensing system when arranged coaxially and non-coaxially in an embodiment.

Referring to FIG. 9, FIG. 9 is a graph showing energy of the light ray condensing system when arranged coaxially and non-coaxially in an embodiment. In an embodiment, a light ray condensing system is provided. The first lens units, the second lens units, and the matrix light source of the light ray condensing system are arranged coaxially, and the distances thereof are uniformly 10.4 mm, the thickness of the biconvex lens is 21 mm, the diameter of the biconvex lens is 80 mm, the total length of the light ray condensing system, that is, the length of the distance from the LED matrix light source to the focal point is 96 mm, and the edge light emitting angle, that is, the angle between the focal point and the edge of the lens is 66°. The highest energy curve of the emitted light is shown by the dashed line in FIG. 9, which is 2.39E+08 lux. In another embodiment, a light ray condensing system is provided. The first lens units, the second lens units, and the matrix light source of the light ray condensing system are arranged non-coaxially. The distance of the matrix light sources is 10.4 mm, the distance of the first lens units is 10.36 mm, the distance of the second lens units is 10.2 mm, the thickness of the biconvex lens is 19 mm, the diameter of the biconvex lens is 72 mm, the total length of the light ray condensing system, that is, the length of the distance from the LED matrix light source to the focal point is 79 mm, and the edge light emitting angle, that is, the angle between the focal point and the edge of the lens is 68°. The highest energy curve of the emitted light is shown by the solid line in FIG. 9, which is 3.13E+08 lux. It can be seen that, the non-coaxial arrangement of the light ray condensing system can greatly enhance the intensity of the emitted light. In addition, it can further shorten the coaxial total length of the light ray condensing system from 96 mm to 79 mm, reducing the system size and reducing the production cost.

Figure 10:
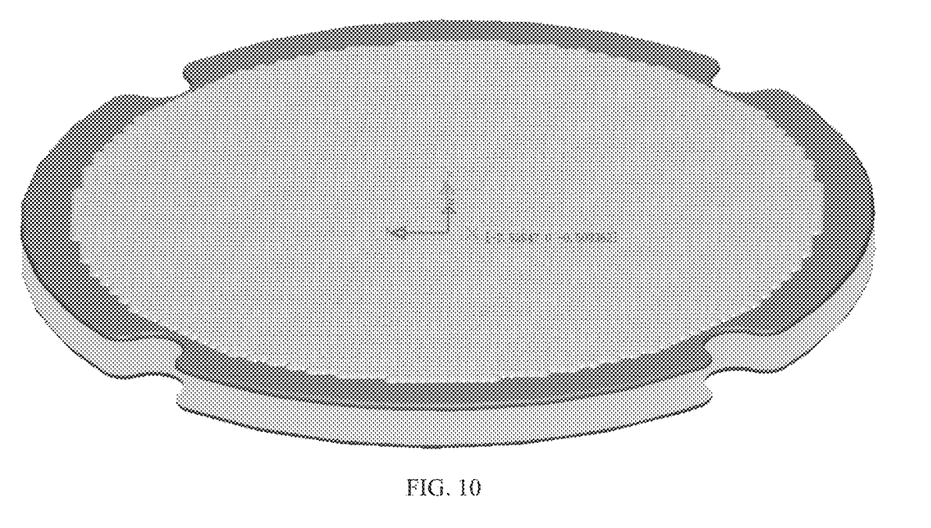
FIG. 10 is a schematic three-dimensional structure diagram of a compound eye lens in an embodiment.
Figure 11:
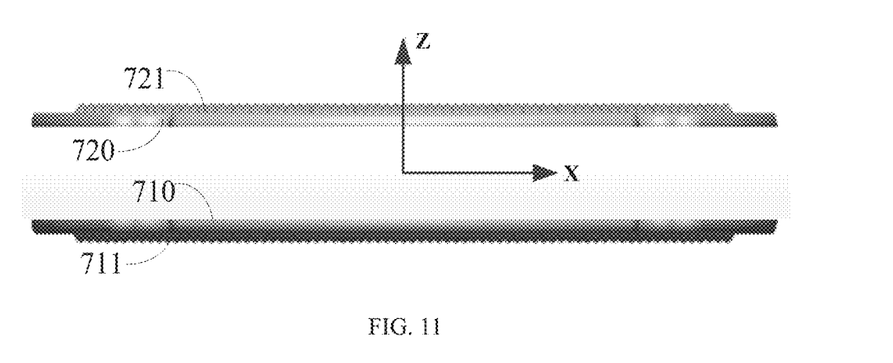
FIG. 11 is a schematic two-dimensional structure diagram of a compound eye lens in an embodiment.

Referring to FIG. 10 and FIG. 11, FIG. 10 is a schematic three-dimensional structure diagram of a compound eye lens in an embodiment, and FIG. 11 is a schematic two-dimensional structure diagram of the compound eye lens in the embodiment. In an embodiment, a compound eye lens 700 is provided, including the matrix optical system described in the first to sixth embodiments above. The first lens unit 711 and the second lens unit 721 are arranged opposite to each other in opposite directions.

The distance of the first lens units 711 is 1 mm, the distance of the second lens units 721 is 1.005 mm, and the focal lengths of the lens units gradually increase outwards from the geometric center of the compound eye lens. After the light ray is incident on the first lens, the light ray will converge at a focal point on the second lens side.

This embodiment mainly provides a compound eye lens including a matrix optical system. Using the design principle of the matrix optical system, the distance of the first lens units is set greater than the distance of the second lens units on the object point side, and the focal lengths of the lens units of these two lenses are gradually increase outwards from the geometric center of the compound eye lens, and then the light imaging effect on the image point side is convergence. By using the matrix optical system of the present disclosure to design the compound eye lens, not only the volume of the compound eye lens can be reduced, but also a compound eye lens can be made by adopting two pieces of optical material with different dispersion values, so as to achieve the purpose of achromatic aberration.

It should be noted that, in the matrix optical system, light ray condensing system, and compound eye lens proposed by the present disclosure, the shape of the first lens units on the first lens can be different from the shape of the second lens units. The position of the first lens units and the position of the second lens units can be arranged in the same direction or can also be arranged opposite to each other and back-to-back. When the matrix optical system needs to be used to play the role of light ray condensing, it is only required that the distance of the lens unit closer to the object point is set greater than the distance of the lens unit closer to the image point, and the focal lengths of the lens units gradually increase outwards from the center. When the matrix optical system needs to be used to play the role of diverging, it is only required that the distance of the lens unit closer to the object point is set less than the distance of the lens unit closer to the image point, and the focal lengths of the lens units gradually decrease outwards from the center.

The technical features of the above embodiments can be combined arbitrarily. To simplify the description, not all possible combinations of the technical features in the above embodiments are described. However, all of the combinations of these technical features should be considered as within the scope of this disclosure, as long as such combinations do not contradict with each other. The above embodiments are merely illustrative of several embodiments of the present disclosure, which are described specifically and in detail, but they cannot be understood to limit the scope of the present disclosure. It should be noted that, for those ordinary skilled in the art, several variations and improvements can be made without departing from the concept of the present disclosure, and all of which are within the protection scope of the present disclosure. Therefore, the protection scope of the present disclosure shall be defined by the appended claims.

What is claimed is:

1. A light ray condensing system, comprising a matrix light source and a matrix optical system, the matrix optical system comprising a first lens and a second lens, the first lens being arranged between the matrix light source and the second lens, light rays emitted from the matrix light source being incident on the first lens,
    wherein the matrix light source includes a plurality of light sources each of which emits a light ray towards the first lens;
    wherein the first lens includes a plurality of first lens units, focal lengths of the plurality of first lens units are different, the second lens includes a plurality of second lens units, focal lengths of the plurality of the second lens units are different, a distance of the plurality of first lens units is different from a distance of the plurality of second lens units, and the first lens is arranged in parallel to the second lens and the first lens is spaced apart from the second lens;
    wherein the focal lengths of the plurality of first lens units and the focal lengths of the plurality of second lens units gradually increase outwards from a geometric center of the matrix optical system; and
    wherein a distance of the matrix light source is a, the distance of the first lens units is b, and the distance of the second lens units is c, where a≥b≥c, wherein the distance of the first lens units represents a distance between axes of two adjacent first lens units of the plurality of first lens units, the distance of the second lens units represents a distance between axes of two adjacent second lens units of the plurality of second lens units, and the distance of the matrix light source represents a distance between geometrical centers of two adjacent light sources of the plurality of light sources.

2. The light ray condensing system according to claim 1, wherein the plurality of light sources are composed of N light sources, the plurality of first lens units of the first lens are composed of N lens units, and the plurality of second lens units of the second lens are composed of N lens units, where N≥2.

3. The light ray condensing system according to claim 1, wherein the plurality of first lens units is arranged non-coaxially with the plurality of second lens units.

4. The light ray condensing system according to claim 2, wherein the plurality of light sources and the plurality of first lens units are arranged in a one-to-one correspondence, and the plurality of first lens units and the plurality of second lens units are arranged in a one-to-one correspondence.

5. The light ray condensing system according to claim 1, wherein axes of the plurality of first lens units are in parallel with each other, and axes of the plurality of second lens units are in parallel with each other.

6. The light ray condensing system according to claim 1, wherein the plurality of first lens units is different in curved surface structure from the plurality of second lens units.

7. The light ray condensing system according to claim 1, wherein the first lens and the second lens are arranged in parallel and spaced apart in a same direction.

8. The light ray condensing system according to claim 1, further comprising a biconvex lens, wherein the first lens and the second lens are arranged between the matrix light source and the biconvex lens.

9. The light ray condensing system according to claim 1, wherein the plurality of first lens units and the plurality of second lens units are arranged in a same direction.

10. The light ray condensing system according to claim 1, wherein the plurality of first lens units and the plurality of second lens units are arranged opposite to each other in opposite directions.

\* \* \* \* \*